E. G. YEATES.
GAPPED WHEEL.
APPLICATION FILED MAR. 15, 1910.
1,006,039.
Patented Oct. 17, 1911.
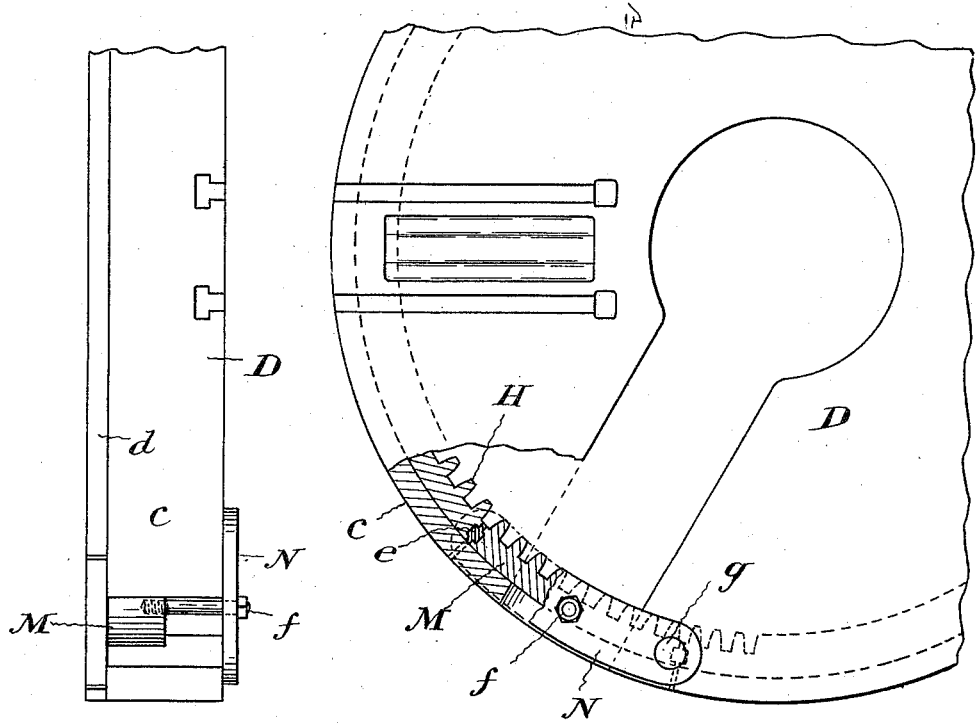
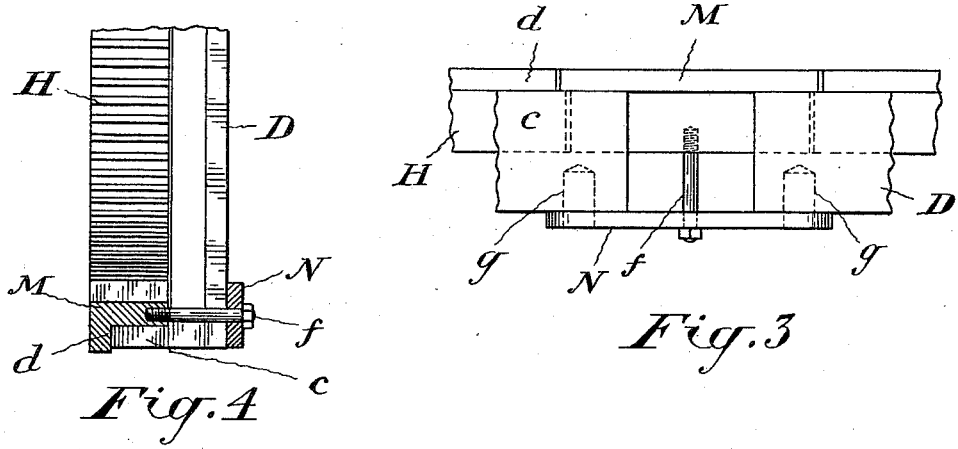
WITNESSES:
INVENTOR.
BY
ATTORNEY.

UNITED STATES PATENT OFFICE.

ERNEST G. YEATES, OF HAMILTON, ONTARIO, CANADA.

GAPPED WHEEL.

1,006,039.

Specification of Letters Patent.

Patented Oct. 17, 1911.

Application filed March 15, 1910. Serial No. 549,454.

*To all whom it may concern:*

Be it known that I, ERNEST G. YEATES, of the city of Hamilton, in the Province of Ontario, Canada, have invented certain new and useful Improvements in Gapped Wheels, of which the following is a specification.

This invention relates to drive wheels for use in central drive lathes in which car wheels may be turned while attached to their axles. In such lathes the ends of an axle are engaged by two tail stocks and the wheels are driven from a head stock located between them. In previous machines the central drive has been obtained through the medium of a worm and worm wheel, the power being transmitted to the face plates of the head stock through the medium of a central shaft, the shafts and face plates being gapped or slotted to admit of the axle occupying a position in the axis of the lathe. There are many disadvantages in such a construction which I have overcome by driving each face plate of the head stock through the medium of internal gear wheels directly formed on or connected thereto.

The internal gears are provided with removable segments to permit of the axle passing through into the slot in the face plate and head stock to its position in the axis of the lathe, and it is to the construction of these gear wheels that the present invention relates.

Figure 1 is a front elevation of a portion of a gapped wheel constructed in accordance with my invention. Fig. 2 is a side elevation of the same. Fig. 3 is a detail illustrating more particularly the construction of the removable segment of the wheel. Fig. 4 is a section through the removable segment and part of the wheel.

In the drawings, like letters of reference indicate corresponding parts in the different figures.

D is a wheel adapted for the face plate of a lathe. This wheel is gapped, as shown. The wheel D carries a toothed rim H forming an internal gear wheel. This latter is also gapped and provided with a removable gear segment M.

In order to secure the necessary strength, I prefer to construct the rim of each wheel D, the toothed rim H, and the gear segment M in the following manner. It will be noted that each wheel is provided with a rim or flange $c$. The toothed rim H fits within this rim $c$ and is preferably provided with a shoulder $d$ fitting against the edge of the rim $c$. The rim H is secured in place by screws or bolts passing through the shoulder $d$ into the rim $c$. The gap in the toothed rim H is wider than the gap in the wheel and its rim $c$ (see Fig. 1) so that the gear segment M, spans the gap in the wheel. This gear segment is slightly tapered and is removable by a movement parallel to the axis of the wheel. It is held in accurate alinement with the remainder of the toothed rim H by means of steel keys $e$ which engage the ends of the segment and the adjoining ends of the toothed rim H. The gear segment is drawn into place and securely held through the medium of the clamp N, spanning the gap in the wheel. A screw bolt $f$ engages the segment and the wheel and by its means the segment may be drawn into place and securely clamped. Pins $g$ are formed on the clamp and engage suitable holes in the wheel to prevent the clamp turning. By this arrangement the segment is securely held in place and the complete wheel will be found as strong as if no removable segment were employed.

What I claim as my invention is:—

1. A wheel having a radial gap formed therein; a toothed rim on said wheel having a gap therein wider than the gap in the wheel; a gear segment adapted to fit the gap in the toothed rim and removable therefrom in a direction normal to the face of the wheel; a clamp spanning the gap in the wheel; and a means engaging the clamp and the gear segment to hold the latter in place.

2. A wheel having a radial gap formed therein; a toothed rim on said wheel having a gap therein wider than the gap in the wheel; a gear segment adapted to fit the gap in the toothed rim and removable therefrom in a direction normal to the face of the wheel; a clamp spanning the gap in the wheel; a screw engaging the clamp and the gear segment to hold the latter in place; and engaging means between the clamp and wheel preventing the turning of the clamp.

3. A rimmed wheel having a radial gap formed therein extending through the wheel and rim; a toothed rim fitted within the wheel rim and having a gap formed therein wider than the gap in the wheel rim; a gear segment adapted to fit the gap in the toothed rim; a clamp spanning the gap in the wheel; a screw bolt engaging the clamp and the gear segment to hold the latter in place; and engaging means between the clamp and wheel preventing the turning of the clamp.

4. A wheel having a radial gap formed therein; a toothed rim on said wheel having a gap therein wider than the gap in the wheel; a gear segment adapted to fit the gap in the toothed rim and removable therefrom in a direction normal to the face of the wheel; a clamp spanning the gap in the wheel; a screw bolt engaging the clamp and the gear segment to hold the latter in place; and a key at each end of the segment engaging the adjacent ends of the gap and segment.

5. A rimmed wheel having a radial gap formed therein extending through the wheel and rim; a toothed rim fitted within the wheel rim and having a gap formed therein wider than the gap in the wheel rim; a gear segment adapted to fit the gap in the toothed rim; a clamp spanning the gap in the wheel; a screw bolt engaging the clamp and the gear segment to hold the latter in place; engaging means between the clamp and the wheel preventing the turning of the clamp; and a key at each end of the segment engaging the adjacent ends of the gap and segment.

Dated at Toronto this 11th day of March 1910.

ERNEST G. YEATES.

Signed in the presence of—
J. Edw. Maybee,
D. S. Tooell.

---

Copies of this patent may be obtained for five cents each, by addressing the "Commissioner of Patents, Washington, D. C."